3,501,352
COMPOSITION AND METHOD FOR TREATING ZINC SURFACES
Vinod D. Shah, Detroit, Mich., assignor to Hooker Chemical Corporation, Niagara Falls, N.Y., a corporation of New York
No Drawing. Filed Aug. 2, 1965, Ser. No. 476,693
Int. Cl. C23c 1/10; C23f 7/26, 7/02
U.S. Cl. 148—6.2                                   8 Claims

ABSTRACT OF THE DISCLOSURE

A method and rinse composition suitable for rinsing complex oxide coated zinc surfaces to provide an improved paint base. The rinse composition comprises at least 0.001% by weight of trivalent chromuim, at least 0.01% by weight of zinc and at least 0.005% by weight of fluoride ions.

---

This invention relates to an improved composition and method for coating metal surface, and more particularly relates to improved solutions and methods for treating chemically formed coatings on metal surfaces so as to provide an improved base for paint, lacquire, varnish or similar organic finishes.

In the treatment of metal surfaces to receive a paint or similar organic finish, it is conventional to apply a dilute chromic acid rinse over a paint-base coating, such as a phosphate, chromate, oxide coating, or the like, which has been applied to the metal surface. With the advent, in recent years, of various synthetic resin based paint systems, such as acrylics, difficulties have sometimes been encountered. Particularly when such acrylic paints have been applied over complex oxide coatings, these difficulties have been evidenced by poor paint adhesion after exposure to salt spray. Efforts to overcome these problems by using modified chromic acid rinses, even including those containing trivalent chromium have not been successful. According, to the present time, there has not been a completely satisfactory way of overcoming the poor paint adhesion on exposure to salt spray of acrylic paints applied over a complex oxide coating.

It is, therefore, an objecet of the present invention to provide an improved composition for rinsing chemical conversion coatings on zinc surfaces so as to provide an improved paint-base coating on the surface.

Another object of the present invention is to provide an improved process for treating zinc surfaces to provide an improved paint-base coating on the surface.

A further object of the present invention is to provide an improved method of treating chemical conversion coatings applied to zinc surfaces so as to obtain an improved paint-base coating on the metal surface.

These and other objects will become apparent to those skilled in the art from the description of the invention which follows.

Pursuant to the above objects, the present invention includes an aqueous composition suitable for rinsing chemical coatings on metal surfaces, which composition comprises at least about 0.001 percent by weight of trivalent chromium in the form of a chromium chromate complex, at least about 0.005 percent by weight zinc and at least 0.002 percent by weight fluoride ions. When a chemical conversion coating on a metal surface is rinsed with this composition, there is obtained a greatly improved paint-base coating on the metal surface and subsequently applied protective films, such as a paint film, are found to have greater adhesion when subjected to salt spray, humidity and deformation.

More specifically, the rinsing compositions of the present invention are aqueous solutions containing at least 0.001 percent by weight of trivalent chromium in the form of a chromium chromate complex, and preferably contain the trivalent chromium in an amount within the range of about 0.01 to about 0.5 percent by weight of the aqueous composition. It is to be appreciated that the trivalent chromium may be present in the composition in amounts within the range of about 0.001 percent by weight up to the maximum solubility of the added chromium chromate complex. In many instances, however, amounts of trivalent chromium in an excess of about 0.5 percent by weight, e.g. 10%, have not been found greatly to increase the quality of the paint-base coating. This is not to say that such greater amounts are detrimental, but merely that in many typical operations they have not been found to be necessary and, hence, are not normally used.

Desirably, the chromium chromate complex, which supplies the trivalent chromium in the composition, contains from about 1 to 60% by weight of trivalent chromium. Although various chromium chromate complexes may be used, preferably the complex is prepared from aqueous chromic acid solutions by reducing the chromic acid with any of various materials which are capable of reducing the hexavalent chromium ions in the chromic acid to the trivalent state. Typical materials which are suitable are those which contain active hydroxyl, aldehyde, or carboxyl groups. As has been indicated hereinabove, the reduction of the hexavalent chromium in the chromic acid is desirably carried out to the extent of from about 1 to about 60 percent by weight of the hexavalent chromium, although a suitable rinse solution can be formed where an even greater reduction of the hexavalent chromium is obtained, so long as the amount of reduction is insufficient to make the chromium chromate complex in the form of a gel.

Exemplary of materials which may be used to effect the reduction of the aqueous chromic acid solution are monohydroxy alcohols such as methyl, ethyl, propyl, isopropyl, and butyl alcohols and the like; dihydroxy alcohols such as glycol, polyethylene glycols and the like; polyhydroxy alcohols such as glycerine, mannitol, sorbital, and the like; aldehydes, including both aliphatic and aromatic aldehydes, such as formaldehyde, acetaldehyde, benzaldehyde, and the like; phenol; and carboxylic acids, such as citric acid, tartaric acid, and the like. Desirably, the reducing agent used is one which is capable of causing the reduction of the hexavalent chromium ions in the aqueous chromic acid solution to trivalent chromium ions in a relatively short time.

It is to be appreciated, of course, that in addition to organic reducing agents, examples of which have been given hereinabove, various suitable inorganic reducing agents may also be used to effect the formation of the desired chromium chromate complex from chromic acid solutions. Exemplary of such inorganic reducing agents which may be used are various metals, including lithium, aluminum, and zinc, as well as metallic compounds such as lithium borohydride, lithium tetrachloride, zinc hydride, and various suitable Raney nickel complexes. Additionally, admixtures of solutions of chromic acid or other hexavalent chromium compounds such as chromates and dichromates, with various trivalent chromium compounds, such as chromic chloride, chromic nitrate, chromic sulfate and the like, may also be used in some instances. In all cases, however, the amount of reducing agent or trivalent chromium compound combined with the chromic acid solution or other source of hexavalent chromium will be sufficient to produce the desired chromium chromate complex, in a non-gel form, and preferably containing from about 1 to about 60 percent by weight, of the chromium content of trivalent chromium.

Of all of the various chromium chromate complexes which may be used, in many instances it has been found to be preferable to utilize a complex prepared by reducing an aqueous solution of chromic acid with a lower aliphatic alcohol, such as methanol, to obtain a complex wherein the hexavalent chromium content has been reduced to trivalent chromium, within the range of about 25 to about 50 percent by weight. Accordingly, hereinafter specific reference will be made to such a chromium chromate complex.

In addition to the trivalent chromium, the aqueous solution to the present invention also contains at least about 0.01 percent by weight of zinc and at least about 0.005 percent by weight of fluoride ions. Although the maximum zinc and fluoride ion content of the solutions has not been found to be critical, amounts up to the maximum solubility of the components being suitable, e.g., 5% by weight, it has generally been found to be desirable, if the zinc and fluoride ions are present in the solutions in amounts within the range of about 0.02 to about 0.1 percent by weight and 0.012 to about 0.06 percent by weight, respectively. The zinc and fluoride ions may be added to the compositions of the present invention in the form of various water soluble and/or water dispersible compounds. The only requirement is that the anion or cation added with the zinc and fluoride ions is one which does not have an adverse effect on either the aqueous rinsing solution, the chemically coated surfaces being rinsed or the subsequently applied paint or similar film. Exemplary of zinc compounds which may be used are zinc oxide, zinc carbonate, zinc hydroxide and the like as well as metallic zinc. Typical fluoride materials which may be used are hydrofluoric acid, alkali metal fluorides, such as sodium fluoride, ammonium fluoride, and the like. In many instances, it may be desirable to add the zinc and fluoride ions together as zinc fluorides ($ZnF_2$) since by this method no additional and possibly detrimental anions or cations are added. In any case, the zinc and fluoride compounds will be incorporated in the present solution in amounts which will provide the zinc and fluoride ions in the amounts which have been indicated hereinabove.

With regard to the fluoride addition to the present composition, it is desirable that the fluoride added is a simple fluoride, i.e., $F^-$, rather than a complex fluoride, such as fluorosilicate, fluoborate, fluotitanate, or the like. Although one reason for preferring the simple fluoride instead of the complex fluoride is that of lower cost, there have been indications that it may be preferable to use solutions containing simple fluorides over the use of those containing complex fluorides.

Desirably, the aqueous rinsing solutions of the present invention are at an acidic pH and preferably at a pH within the range of about 2.5 to 4.5. This range is merely preferred and in some instances operation at higher or lower pH values is possible. It has been found to be desirable, however, that the pH of the rinse solution not be above that at which appreciable gelation or insolubilization of the chromium chromate complex occurs. Typically, this upper pH has been found to be about 6, although depending upon additional ions which may be present in the solution, may be above this point.

In preparing the aqueous rinsing solutions of the present invention, as has been indicated hereinabove, the preferred chromium chromate complex used is formed by reducing a dilute chromic acid solution with a lower aliphatic alcohol, such as methanol. The procedure employed for producing this desired reduction product includes the steps of slowly adding an aqueous methyl alcohol solution to an aqueous chromic acid solution, and after preliminary mixing, the mixture is further reacted, with agitation, preferably at a temperature in the range of about 30 to about 80 degrees centigrade for a period of time sufficient to effect the desired reduction of the hexavalent chromium to trivalent chromium. Typically, the reduction times are within the range of about 1 to about 36 hours, depending upon the degree of reduction desired as well as the temperature used, the rate of reduction increasing as the temperature is increased. Thereafter, the zinc and fluoride ion containing compounds are added to the resulting aqueous solution in amounts sufficient to give the desired concentration of these components as has been indicated hereinabove.

Typically, this composition will be in a form of a concentrate to which additional water will be added in order to form the desired operating rinse solution. Such a concentrate will contain the trivalent chromium in an amount within the range of about 1 to 60 percent by weight of the concentrate, hexavalent chromium in an amount from about 1 to 60% by weight, zinc in an amount within the range of about 1 to about 6 percent by weight of the concentrate and fluoride ions in an amount within the range of about 1 to about 4 percent by weight of the concentrate. In formulating the operating rinse solution, sufficient water will be added to this concentrate to obtain an aqueous solution containing the trivalent chromium, zinc and fluoride ions in amounts within the ranges which have been set forth hereinabove.

In the practice of the method of the present invention, the aqueous rinsing solutions, as have been described hereinabove, are applied to a metal surface on which there has been formed a chemical conversion coating. These chemical coatings may be of various types, such as phosphate coatings, oxide coatings, sulfide coatings, oxalate coatings, chromate coatings, arsenate coatings, and the like, as are known to those in the art. Typical phosphate coatings include coatings of zinc phosphate, iron phosphate, as well as alkali metal or ammonium phosphate coatings. Generally, with coatings other than the phosphate coatings, these will be formed from solutions of the alkali metal or ammonium compounds of the coating material desired, e.g., oxide, or the like. The aqueous rinse solutions of the present invention have been found to give particularly advantageous results when applied over a complex oxide coating such as that produced in accordance with a copending application Ser. No. 310,877, filed Sept. 23, 1963, abandoned in favor of streamlined continuation application Ser. No. 623,515, filed Mar. 13, 1967, and now U.S. Patent No. 3,444,007. In the process of this application, the complex metal oxide coating is formed on the metal surface by contacting the surface with an aqueous alkaline solution containing at least one metal ion other than an alkali metal ion and a complexing agent, present in an amount sufficient to maintain the other metal ion in the solution. Exemplary of such solutions is one containing about 0.76 percent sodium hydroxide, about 0.1 percent by weight sodium hexahydroxyheptoate, as a complexing agent or sequesterant, about 0.0037 percent by weight iron added as ferric nitrate nonahydrate, and about 0.0024 percent by weight cobalt added as cobalt nitrate hexahydrate.

The aqueous rinsing solution of the present invention may be applied to the chemically coated metal surfaces to be treated using various techniques, including rolling, brushing, spraying, flowing, immersion, or the like. In many instances, however, spraying techniques are preferred. Preferably, the aqueous rinsing solution is at an elevated temperature when it is applied to the coated metal surface, temperatures within the range of about 30 to about 65 degrees centigrade being preferred. The aqueous rinsing solution is maintained in contact with the chemically coated surface for a period of time sufficient to effect a thorough and complete rinsing of the surface. Typical contact times are within the range of about 1 to 10 seconds with times of about 2 to 5 seconds being preferred. It is to be appreciated, however, that in some instances both greater and lesser contact times may be used and the temperature of the rinsing solution may be either greater or lesser than those which have been indicated as being preferred. Thereafter, a suitable protective film is applied to the rinsed surface, such as a paint, lacquer, varnish, or other similar organic film. Various different types of protective films may be used, including acrylic, epoxies, alkyds, and the like. Although improvements in adhesion and corrosion resistance are obtained with all of these coatings, the rinsing solutions of the present invention have been found to have particular utility in improving the adhesion and corrosion resistance of acrylic coatings, and in particular the "one-coat" acrylic coating materials.

In addition to maintaining the aqueous rinsing solutions of the present invention within the pH ranges which have been heretofore indicated, it is also desirable that the compositions of the rinsing solutions also be maintained within the range of about 14 to 26 points. The point concentration of these solutions is determined by using the following procedures:

A 25 milliliter sample of the rinse solution is combined with 25 milliliters of a 50 percent aqueous solution of sulfuric acid and 2 drops of orthophenanthroline ferric complex (ferroin) indicator is added to the solution. Thereafter, the resulting solution is titrated with a 0.1 NFeSO$_4$ solution in dilute sulfuric acid until the solution changes color through blue to a reddish-brown. The number of milliliters of the titrating solution used is the point concentration of the rising solution.

In the operation of the overall process of the present invention, a metal surface to be treated is coated with a chemical conversion coating, such as the preferred complex oxide coating as has been described hereinabove. Various metals may be treated by the present process, including iron, steel, zinc, aluminium, copper, brass, bronze, magnesium, titanium and the like. Although the present process has been found to be particularly applicable when used in the treatment of metal sheet or strips, particularly zinc sheet and strip, in some instances it may also be used in the treatment of the surfaces of formed articles. Preferably, prior to the application of the chemical conversion coating, the metal surface to be treated is cleaned, using any suitable alkaline cleaner. The surface is then desirably rinsed with water so as to remove any of the alkaline cleaning solution from the surface before the surface is contacted with the chemical conversion coating solution. Various techniques for effecting contact of the chemical conversion coating solution and the metal surface may be utilized, including brushing, rolling, spraying, immersion, flowing, and the like. The metal surface is maintained in contact with the chemical conversion coating material until the desired chemical coating is formed on the surface. The contact times used will of course vary depending upon the nature of the chemical conversion coating applied. Thereafter, the thus-coated metal surface is desirably rinsed with water and is then rinsed with the aqueous solution of the present invention, preferably by spraying. The thus rinsed surface is then given a paint or similar protective coating, using any suitable coating technique. In some instances, it may be desirable to rinse the surface treated with the trivalent chromium composition with water or deionized water before the application of the paint. The resulting painted surfaces are found to have greatly improved adhesion and resistance to corrosion, particularly after exposure to salt spray.

In order that those skilled in the art may better understand the present invention and the manner in which it may be practiced, the following specific examples are given. It is to be appreciated, however, that these examples are merely exemplary of the present invention and are not to be taken as a limitation thereof. In these examples, unless otherwise indicated, temperatures are given in degrees centigrade and percents are by weight.

EXAMPLE 1

A rinse concentrate was prepared by dissolving 227 parts by weight of flake chromic acid (CrO$_3$) in 300 parts by weight of water. To this solution was then added 12.5 parts by weight of methyl alcohol in 50 parts by weight of water and the resulting solution, at a temperature of about 77° centigrade was reacted for a period of two hours. Thereafter, 14 parts by weight of a 70% aqueous solution of hydrofluoric acid and 17.4 parts by weight of zinc oxide were added to the solution. An additional 459 parts by weight of water were then added to form the final rinse concentrate.

From this concentrate, the aqueous operating rinsing solution was prepared by admixing the concentrate in water in an amount of about 14 parts by weight of the concentrate for each 100 gallons of rinse solution. This rinse solution contained 0.7 percent hexavalent chromium, 0.03% trivalent chromium, 0.008% F$^-$ and 0.012% Zn$^{++}$. A series of 4 inch by 12 inch clean hot dip galvanized steel panels were sprayed for 10 seconds with an aqueous coating solution containing the following components in the amounts indicated:

| | Percent |
|---|---|
| NaOH | 3.0 |
| Cobalt | 0.032 |
| Iron (ferric) | 0.022 |
| Sodium hexahydroxy heptoate | 0.2 |
| Water to make 100%. | |

This coating solution was at a temperature of 55 degrees centigrade. Thereafter the panels were sprayed with water for 10 seconds and were then rinsed with the above rinse solution by spraying, and the excess rinse solution removed by squeegeeing.

The rinsed panels were then painted with a one-coat white acrylic paint and subjected to the standard 5% salt spray test for 504 hours. At the end of this time the panels showed scattered spots having a creepage of only 1/16 inch from the scribe on the panel.

EXAMPLE 2

By way of comparison, the procedure of Example 1 was repeated with the exception that the rising solution used did not contain any hydrofluoric acid or zinc oxide. The painted panels were subjected to the salt spray test and after 504 hours, the panels showed scatttered spots, having a creepage of 3/16 inch from the scribe.

EXAMPLE 3

By way of further comparison, the procedure of Example 1 was repeated with the exception that the rinse solution used contained only 0.1% of hexavalent chromium, added as CrO$_3$. At the end of the 504 hour salt spray test, the panels had a uniform creepage of 1/16 inch and scattered spots having a creepage of 3/16 inch from the scribe.

EXAMPLE 4

The procedure of Example 1 was repeated with the exception that the operating rinse solution was formulated by adding the rinse concentrate to water in an amount of about 20 parts by weight of the concentrate for each 100 gallons of operating solution. After painting the panels with an acrylic paint, and subjecting them to the test as set forth in Example 1 similar results were obtained in terms of the resistance of the paint film to salt spray.

EXAMPLE 5

The procedure of Example 1 was repeated with the exception that the rinse concentrate was formulated by adding zinc fluoride, rather than zinc oxide and hydrofluoric acid, in amounts sufficient to provide 0.1% zinc and 0.06% fluoride ions in the operating rinse solution. Similar results in terms of the resistance of the painted panels to salt spray were obtained.

EXAMPLE 6

The procedure of Example 1 was repeated with the exception that the panels treated were aluminum panels coated by spraying for 15 to 20 seconds with a solution containing 0.25% $CrO_3$, 0.35% fluoride ions, added as HF, 0.1% aluminum, and 0.08% potassium ferricyanide, which solution had a pH of 1.6 and was at a temperature of about 40° centigrade instead of the complex oxide coating solution. At the end of 1176 hours in the salt spray test no creepage was found on the panels.

EXAMPLE 7

The procedure of Example 1 was repeated with the exception that the panels treated were cold rolled steel panels coated by spraying for about 60 seconds with a solution containing 0.23% zinc, 0.45% $PO_4$, 0.56% calcium, 2.48% nitrate and 0.17% ferric iron, which solution had a total acid number of 15.1 and a free acid number of 1.0 and was at a temperature of about 80° centigrade instead of the complex oxide coating solution. At the end of 504 hours in the salt spray, the panels showed a creepage of 1/16 inch from the scribe.

EXAMPLE 8

The procedure of Example 1 was repeated with the exception that the rinse concentrate solution was prepared by adding 28 parts of a 25% aqueous solution of formaldehyde to 364 parts of a 25% aqueous solution of $CrO_3$. The painted panels obtained gave similar results when subjected to the salt spray test as set forth in Example 1.

EXAMPLES 9 AND 10

The procedure of Example 1 is repeated with the exception that the panels treated are steel panels coated with an oxylate coating and an arsenate coating, to obtain comparable results.

What is claimed is:

1. A method of treating a zinc surface having a complex oxide chemical coating thereon which comprises contacting the coated zinc surface with an aqueous composition which comprises at least about 0.001% by weight of trivalent chromium in the form of a chromium chromate complex, at least about 0.01% by weight zinc and at least about 0.005% by weight fluoride ions, said solution being acidic and having a pH which is not substantially in excess of about 6, and maintaining said aqueous composition in contact with said surface for a period sufficient to effect thorough rinsing thereof.

2. The method as claimed in claim 1 wherein the pH of the aqueous composition is within the range of about 2.5 to about 4.5.

3. The method as claimed in claim 2 wherein the aqueous composition contains trivalent chromium in an amount of from about 0.001% to 0.25% by weight, zinc in an amount of from 0.02% to 0.1% by weight and fluoride ions in an amount of from about 0.01% to 0.06% by weight.

4. A method of treating a zinc surface which comprises contacting the zinc surface with a complex oxide chemical coating solution for a period sufficient to form a complex oxide chemical coating on the surface, rinsing the thus-formed complex oxide chemical coating with an aqueous composition which comprises at least about 0.001% by weight of trivalent chromium in the form of a chromium chromate complex, at least about 0.01% by weight zinc and at least about 0.005% by weight fluoride ions, said solution being acidic and having a pH which is not substantially in excess of about 6, and, thereafter, coating the thus-rinsed surface with a paint.

5. The method as claimed in claim 4 wherein the pH of the rinsing solution is within the range of about 2.5 to about 4.5.

6. The method as claimed in claim 5 wherein the aqueous rinsing solution contains the trivalent chromium in an amount of from about 0.001% to 0.25% by weight, the zinc in an amount of about 0.02% to about 0.1% by weight, and the fluoride ions in an amount of from about 0.01% to about 0.06% by weight.

7. A metal surface prepared in accordance with the method of claim 1.

8. A metal surface prepared in accordance with the procedure of claim 4.

References Cited

UNITED STATES PATENTS

| | | | |
|---|---|---|---|
| 2,186,177 | 1/1940 | Romig | 148—6.15 |
| 3,066,055 | 11/1962 | Pimbley | 148—6.2 X |
| 3,113,051 | 12/1963 | Pimbley et al. | 148—6.2 |
| 3,222,226 | 12/1965 | Maurer et al. | 148—6.16 |
| 3,279,958 | 10/1966 | Maurer et al. | 148—6.2 X |

ALFRED L. LEAVITT, Primary Examiner

THOMAS E. BOKAN, Assistant Examiner